United States Patent

Floyd et al.

[11] 3,770,424
[45] Nov. 6, 1973

[54] PROCESS FOR RECOVERY OF ALUMINUM FROM FURNACE SKIM

[75] Inventors: Paul H. Floyd, Danville, Calif.;
George J. Binczewski, Ravenswood, W. Va.

[73] Assignee: Kaiser Aluminum & Chemical Corporation, Oakland, Calif.

[22] Filed: Sept. 7, 1971

[21] Appl. No.: 178,304

[52] U.S. Cl. ............... 75/68 R, 75/24, 241/24, 241/27
[51] Int. Cl. ................................ C22b 21/00
[58] Field of Search ............... 75/24, 68; 241/15, 241/24, 27, 30

[56] References Cited
UNITED STATES PATENTS

| 3,037,711 | 6/1962 | Businger | 241/24 |
| 2,833,482 | 5/1958 | Weston et al. | 241/30 |
| 1,615,009 | 1/1927 | Frost | 75/24 X |
| 3,043,678 | 7/1962 | Lowry et al. | 75/68 R X |
| 2,942,792 | 6/1960 | Anderson et al. | 241/24 X |
| 3,081,954 | 3/1963 | Heckett | 241/24 X |
| 3,321,143 | 5/1967 | Claiborne | 241/24 X |
| 3,625,440 | 12/1971 | Bond | 241/30 X |
| 3,657,997 | 4/1972 | Vellella | 241/30 X |
| 3,510,074 | 5/1970 | Edwards et al. | 241/153 |
| 3,676,105 | 7/1972 | McLeod et al. | 75/24 X |
| 3,675,859 | 7/1972 | Mitchell | 241/24 X |

Primary Examiner—L. Dewayne Rutledge
Assistant Examiner—M. J. Andrews
Attorney—Paul E. Calrow

[57] ABSTRACT

A process for recovering metal values from furnace skim comprising a controlled wet comminution of the skim at a reduced work input level in a ball mill having a ball charge of from 5 to 20 percent of the internal mill volume. The comminuted product is separated into a coarse and fine fraction, the coarse fraction being substantially metal and the fine fraction being substantially non-metals such as oxides, nitrides, and the like.

10 Claims, 1 Drawing Figure

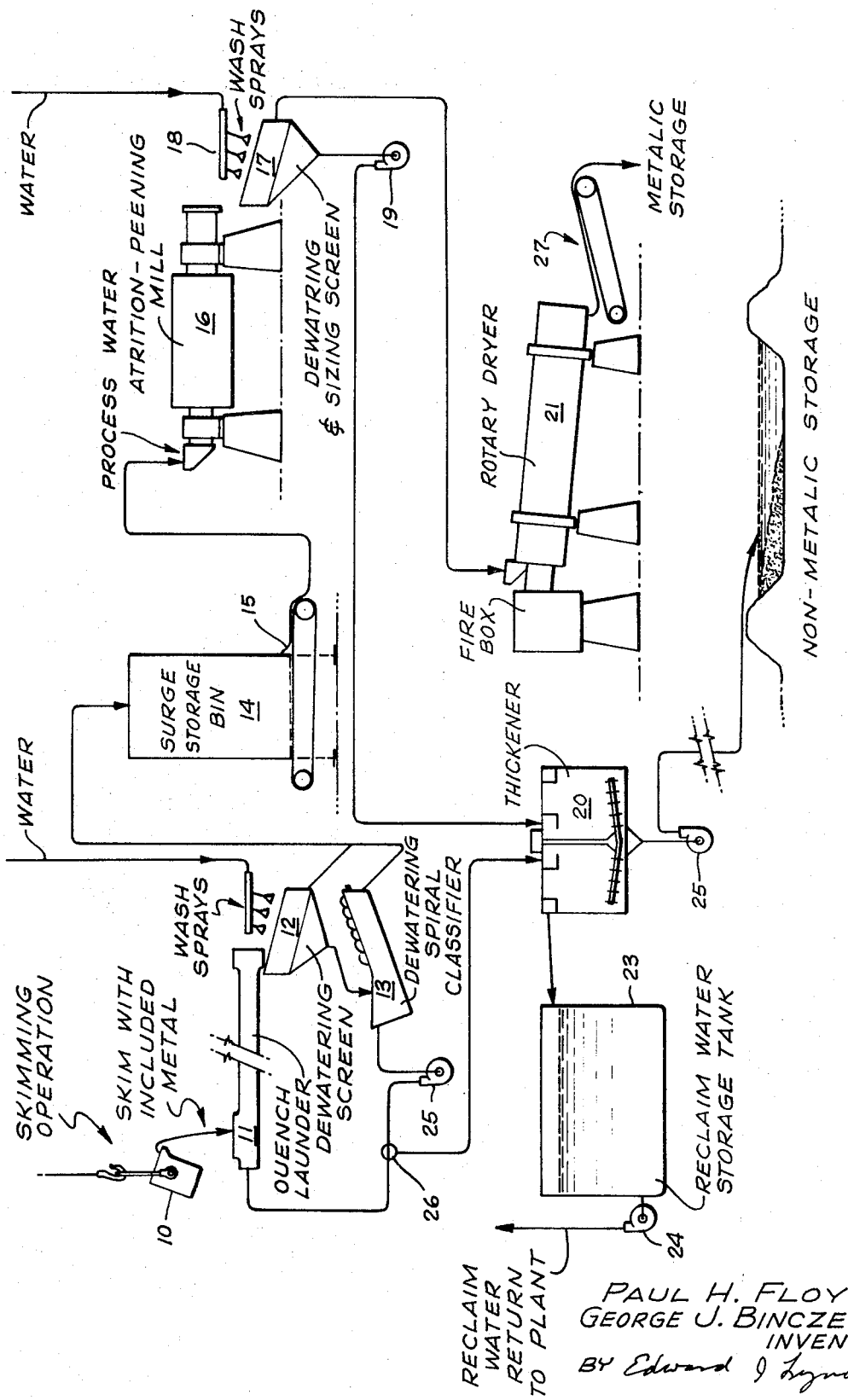

PROCESS FOR RECOVERY OF ALUMINUM FROM FURNACE SKIM

BACKGROUND OF THE INVENTION

This invention relates to the recovery of metal values from furnace skim which is formed during the melting of light metals such as aluminum, magnesium and the like.

During the course of melting operations, such as remelting and refining of metals, oxides, nitrides and other non-metallic impurities accumulate on the surface of the molten metal and in the trade is referred to as furnace skim. Normally, prior to tapping of the molten metal, these non-metallics are removed or skimmed from the surface of the melt. Substantial quantities of metal will be entrained unavoidably with the non-metallics and be removed along with these non-metallics. The amount of free metal in this furnace skim can vary up to 95% (the normal range would be 50 to 80%) of the total weight of the furnace skim, depending of a number of factors such as the composition of the alloy being melted, the melting procedure followed, and the care with which the furnace skim is removed from the melt. Usually, when the skim is removed from the top of the melt, the skim forms a heterogeneous mass which may be loosely packed as well as dense. The size o these masses varies from microscopic size to as coarse as 1½ feet in diameter. If the hot skim removed from the melt is allowed to stand, some free metal will accumulate at the bottom of the mass, but a large part of the free metal will remain intimately mixed with the non-metallics in the form of globules or small particles, which cannot be readily separated from the non-metallic portion. The separation of the free metal from the non-metallic portion of the dross has been a difficult problem particularly with aluminum.

Several methods have been proposed and used for effecting the separation. One method is to cool the dross to room temperature as quickly as possible, thoroughly dry grinding the cooled dross in a ball mill and then screening the comminuted material. In practice, this method did not provide an efficient separation because a large portion of the aluminum particles were very fine and could not readily be separated for reclaiming from the oxide dross. Furthermore, the metallic particles were not readily wetted by molten metal. Another method is described in U.S. Pat. No. 3,043,678 wherein the dross is mixed with a salt flux comprising a mixture of sodium chloride, potassium chloride, and a fluoride-containing compound in a rotating barrel or furnace. Although good metal recoveries could be obtained by the process set forth in this patent, the process presents a substantial problem in the disposal of the resulting sakt dross. Because of the increased government regulations related to environmental pollution, the disposal of this untreated salt dross is severely restricted if not completely prohibited. The treatment of skim with the salt flux process would be economically unacceptable when resulting dross is disposed in a manner acceptable to the governmental bodies.

In a Bureau of Mines report, No. RI 3874 by O.C. Garst et al, a process is described for recovery of metallic aluminum from dross, or furnace skim, which comprises hand sorting large metallics from the skim, crushing the resultant skim in a jaw crusher, and screening on a three-quarter-inch vibrating screen. The undersized material is passed to a Williams mill (a hammer mill) followed by an air classifier. The oversized material is further reduced through a roll crusher and then subsequently screened on a three-quarter-inch vibrating screen. The screen oversized from the roll grinding operation is considered as metallics; the screen undersized from the roll crushing is further ground in a Williams mill and passed to an air classifier, the fines being considered non-metallics, and the coarse produce being considered dirty metallics. The dirty metallics are subsequently screened on a 35 mesh vibratory screen. The oversized is further ground on a roll crusher, again screened on a 35 mesh screen, the oversized being considered metallics and the undersized being discarded as non-metallics. All of the metallics are then mixed with a flux material to separate the residual oxide material from the metallics in a standard crucible melting furnace. The total metal recovery from this rather complex process was about 67 percent, which is too low to justify the capital expense and operating costs involved. Furthermore, a substantial quantity of salt flux is required, which presents a dross disposal problem.

SUMMARY

The present invention is directed to an advantageous solution to the problem of recovering metal values from furnace skim which is formed during the melting of light metals such as aluminum, magnesium and the like. Further, the present invention provides a process for recovering up to 90 percent or more of the metallic material in the skim, yet maintaining the metal content of the product recovered greater than 85 percent.

The process essentially comprises the controlled aqueous comminution of furnace skim at a reduced work input level and then separating the slurried product into coarse and fine fractions. The skim, along with sufficient water to effect a mixture of about 40 to 60% by weight solids, is fed to a ball mill having a ball charge from 5 to 20% of the internal mill volume. The work input is maintained from 3 to 8 net horsepower hours per ton of skim feed, preferably from 4 to 7 net horsepower hour per ton. Preferably, the comminuted slurried product is separated with a screen having a mesh opening from 10 to 65 mesh (Tyler).

DETAILED DESCRIPTION OF THE INVENTION

The present invention provides an improved process for the recovery of metal values from furnace skim and the like. In accordance thereto the furnace skim, which is removed from the furnace, is cooled, partially comminuted in a water medium at a substantially reduced and controlled work input level and then separated into a coarse, relatively unground, fraction being substantially metallic material, and into a fine well-ground fraction being substantially non-metallic materials. The skim, when removed from the furnace, can be cooled in any manner, although it is preferred to quench rapidly in water to avoid excessive oxidation of contained metallic aluminum, and to effect some size reduction. The furnace skim is then comminuted in a water medium at a reduced work input level to preferentially reduce the size of the brittle oxide and other non-metallic particles. To obtain the preferential reduction of the non-metallics, the work is controlled to between about 3 and 8 net horsepower hour per ton of skim feed, preferably between 4 and 7 horsepower hour per ton. The reduced work input is controlled by maintaining a reduced cast iron or steel ball charge of about 5 to 20% of the internal mill volume, as compared to the normal 38 to 42% of the internal mill volume for conventional grinding. Mill rotational speed is maintained between 50 and 70% of critical speed. The net horsepower requirements as herein described are determined from the difference of the horsepower utilized in the operation of the mill at normal feed and ball loading, and the horsepower utilized in operating the mill without feed, but with the same ball loading. In the initial ball charge, and in any ball addition, the ball size should be between 1 and 4 inches in diameter, preferably from 2 to 4 inches in diameter for coarse skim. The length dimension of the ball mill should be between 2 and 4 times the diameter dimension.

In accordance with this invention, sufficient amounts of water are added to the mill so that a slurry containing between about 40 and 60% solids will result for processing. The controlled comminution in a water medium is necessary in the present invention to provide a better separation between the non-metallics and the metal particles by the expedient of washing the metal surfaces as the oxide component of the skim is selectively ground to a finer size range. Also, the water medium serves as a vehicle to transport the solids through the comminution step providing more equalized work input to the total solids.

The controlled low work input comminution process of the present invention is herein termed "attrition-peening" which more accurately connotes the mode of the comminution process. During this process, the oxide and other non-metallics through a peening and an attrition action are removed from the metallic particles and selectively comminuted to a finer size in an aqueous medium. The metallic particles sustain a minimum of size reduction and are simultaneously densified by the same peening action of the balls.

In the prior method of grinding skim, the milling was dry, and the finely powdered non-metallics had the tendency to coat the metal particles. The non-metallic coating of the metal particles made it extremely difficult to coalesce the metal particles into the molten metal bath during subsequent remelting procedures. The coated particles could not be wetted with the molten metal of the bath.

The process of the present invention provides for the controlled comminution of at least 85% of the non-metallics to a particle size less than 28 mesh (Tyler), usually less than 48 mesh and for the controlled comminution of at least 85% of the metallics to a particle size greater than 48 mesh, usually substantially greater than 28 mesh.

After attrition-peening, the slurried product is separated into coarse and fine fractions by any suitable means but preferably by screening, the coarse fraction being substantially metallic material and the fine fraction being substantially non-metallic material. The percent metallics in the coarse fraction can be increased by increasing the size openings of the screen used during separation, albeit the percent recovery of metallic values decreases. Generally, the screen size openings range from 10 to 65 mesh, but preferably the openings are between 16 and 48 mesh. The latter range provides a product with the highest metallic content consistent with high recovery of metal values. Inasmuch as the process of the present invention is designed to preferentially reduce the size of the non-metallic portion of the skim and to effect as little reduction as possible of the metallic portion of the skim, recirculation of any oversize fraction to the mill is not contemplated.

Referring now to the figure which is a flow diagram schematically illustrating a preferred process of the invention, there is shown a skim barrel 10 containing hot skim material from the furnace. Molten metal that will readily separate from the oxide skim can be decanted into a sow mold (not shown). The skim remaining in the skim barrel after decantation, which includes as much as 30 to 80% of the original total metal, is dumped into quench launder 11. The quench launder is provided with a high volume of water, as much as 100 times as much water to weight of skim to quickly quench the hot skim to an ambient temperature and to convey the quenched skim through the launder to the dewatering system comprising a screen 12 and spiral classifier 13.

The dewatering screen 12 scalps off the coarse solids fraction (such as plus ⅜ inch material) and delivers the undersized to the dewatering spiral classifier 13. The spiral classifier separates dewatered fine solids which, along with the previously dewatered coarse solids, are conveyed by any suitable means to storage bin 14. The aqueous fraction from the dewatering system is conveyed by pump 25 to the quench launder water. However, a bypass valve 26 is provided to bleed off a proper fraction of the slurry to maintain the recylcle water solids content at a reasonable level, preferably 1% or less. The bypass line discharges directly to the thickener 20.

The surge bin 14 holds the quenched skim prior to attrition-peening beneficiation. Several bins may be used to accumulate and store several alloy types, thus providing alloy segregation. The surge bin is equipped with a feeder 15 that draws a controlled feed for the attrition-peening beneficiation which follows. The skim is conveyed to the intake spout of the attrition-peening mill 16 where a proper quantity of water is mixed to produce a slurry between 40 and 60% solids.

The attrition-peening mill 16, with a ball charge of 5 to 20%, selectively comminutes the skim slurry in such a way that the brittle oxides and other wastes are selectively comminuted to a much finer fraction. The malleable metal sustains a minimum of size reduction and is simultaneously densified and washed to remove the brittle waste materials. The finished slurry is discharged from the mill onto the dewatering mechanical screen 17.

The mechanical screen 17 is supplied with water sprays 18 to facilitate the separation of fine waste from the coarser metal as dewatering and sizing take place. The screen undersize product contains as much as 90% or more of the total non-metallic material in the mill feed. The undersized product, a slurry, is transferred by pump 19 to the thickener 20. The screen oversize is fed to the rotary dryer 21 and the dried product is conveyed by inclined belt conveyer 27 to metallic storage.

The rotary dryer lowers the entrained water in the coarse metallic product from approximately 20% to approximately 0.5% moisture. The dryer discharge constitutes a finished product that may discharge to storage pending remelting operations or be directly transported to remelting operations.

The thickener 20 receives the process waste slurries for separation of a clean water effluent that overflows to reclaim water storage tank 23 for return by pump 24 to the process water system. The thickener under flow consists essentially of the non-metallic wastes concentrated into a 40 to 60% solids slurry that is discharged to pump 25. The pump delivers the process waste solids to a bermed storage area where it is further consolidated and dewatered pending future usage.

If there is a large variance in the particle hardness of the furnace skim, it is advantageous to attrition-peen the entire skim, coarsely screen the product and then repeat an attrition-peening on the undersized product. Preferably, the first attrition-peened product is sized by use of a screen having a mesh opening of from one half inch to one inch. The oversize is considered metallic product and is conveyed to storage. The undersize is again attrition-peened, in accordance with the present invention.

An alternate system which may prove advantageous in certain circumstances is to locate the quench launder adjacent to the furnaces which allows the skim to be raked from the furnace directly into the quench launder. The quench launder transports the skim to the dewatering screen and spiral classifier and from there the skim is conveyed to the ball mill for attrition-peening.

The following is a typical example of the process of the present invention. Twenty tons per hour of quenched skim from an aluminum melting furnace containing 65% metallics are fed to a 6-ft by 18 ft ball mill loaded 5% with 3-inch steel balls, and rotated at 60% of the critical speed. Along with the mill feed was added 4,790 gallons per hour of water to effect a slurried product containing 50% by weight solids. The net horsepower input to the mill was 5 horsepower hour per ton of feed. The slurried product is passed to a 28 mesh vibrating screen for dewatering and sizing. The dewatered +28 mesh material amounted to 13.4 tons per hour containing 90% metallics. This represents a 93% recovery of the metallics which entered the mill. The −28 mesh material amounted to 6.6 tons per hour and was 86% non-metallics.

The metallic products recovered by the process of the present invention have essentially non-metallic free surfaces in comparison to the products recovered by prior art processes employing dry grinding. Moreover, the products of the present invention are submerged into a molten metal bath with little or no effort because the product is readily wetted by the molten metal and because the product generally is more dense than prior art products.

What is claimed is:

1. The process of recovering light metal values from furnace skim containing same comprising
   a. feeding said skim at a temperature below the melting point of the metal values therein to a rotary ball mill having a ball charge between 5 and 20% of the internal mill volume,
   b. adding sufficient water to said mill to effect a mixture of feed and water having a solids content from about 40 to 60% percent by weight,
   c. attrition-peening said feed in said ball mill at a reduced work input until at least 85% of the non-metallic portion of said feed is reduced to a size smaller than 24 mesh and at least 85% of the metal values in the feed have a size greater than 48 mesh, the metal in said feed sustaining a minimum of size reduction,
   d. separating the attrition-peened product into coarse and fine fractions, and
   e. recovering metal values from the coarse fraction, said recovered metal being readily submergible in molten metal.

2. The process of claim 1 wherein the work input is maintained between 3 and 8 net horsepower hour per ton of feed.

3. The method of claim 1 wherein the attrition-peened product is separated into coarse and fine fractions by screening.

4. The method of claim 3 wherein the screening is accomplished with a screen having mesh openings from 10 to 65 mesh.

5. The method of claim 4 wherein the screen has mesh openings from 16 to 48 mesh.

6. The process of claim 1 wherein the metal recovered is aluminum.

7. The process of recovering aluminum from furnace skim containing same comprising
   a. removing furnace skim from a molten aluminum furnace,
   b. cooling said skim,
   c. feeding said cooled skim to a rotary ball mill having a ball charge from about 5 to 20% of the internal mill volume,
   d. adding sufficient water to said mill to effect a mixture of feed and water having a solids content from about 40 to 60% by weight,
   e. attrition-peening said feed in said ball mill at a work level between 3 and 8 net horsepower hours per ton of feed, the aluminum in said feed sustaining a minimum of size reduction,
   f. screening the attrition-peened product into coarse and fine fractions with a screen having mesh openings from about 10 to 65 mesh, and
   g. recovering aluminum from said coarse fraction, said recovered aluminum being readily submergible in molten aluminum.

8. The method of claim 7 wherein the skim is cooled by quenching in water.

9. The process of claim 7 wherein the product is screened with a screen having mesh openings from about 16 to 48 mesh.

10. The process of claim 8 wherein the skim removed from the molten aluminum furnace is placed in a container and the molten aluminum which separates from the skim is decanted from said container prior to quenching said skim in water.

* * * * *